United States Patent
Shimizu et al.

[11] Patent Number: 5,951,031
[45] Date of Patent: Sep. 14, 1999

[54] CABLE STEERING DEVICE WITH STEERING LOCK

[75] Inventors: Yasuo Shimizu; Hiroshi Tabata; Shigeki Ehara, all of Wako, Japan

[73] Assignee: Honda Giken Kogyo Kabushiki Kaisha, Tokyo, Japan

[21] Appl. No.: 08/917,222

[22] Filed: Aug. 25, 1997

[30] Foreign Application Priority Data

Aug. 28, 1996 [JP] Japan .................................. 8-226475

[51] Int. Cl.⁶ .................................................. B60R 25/02
[52] U.S. Cl. ...................... 280/93.502; 180/425; 70/252; 74/496
[58] Field of Search ............................... 280/93.502, 771, 280/778; 180/425, 430, 443, 444; 70/252; 74/496

[56] References Cited

U.S. PATENT DOCUMENTS

| | | | |
|---|---|---|---|
| 3,747,556 | 7/1973 | Kjellberg | 70/252 |
| 3,871,199 | 3/1975 | Perldal | 70/252 |
| 5,573,079 | 11/1996 | Suda et al. | 180/444 |
| 5,598,897 | 2/1997 | Sugiura | 180/430 |

FOREIGN PATENT DOCUMENTS

| | | |
|---|---|---|
| 195 22 508 C1 | 6/1996 | Germany . |
| 7-117625 | 5/1995 | Japan . |

*Primary Examiner*—Peter C. English
*Attorney, Agent, or Firm*—Armstrong, Westerman, Hattori, McLeland, & Naughton

[57] ABSTRACT

A steering-wheel lock mechanism is provided at a position in which a driver can easily operate the lock mechanism in a cable-type steering device, and prevents a large load from being applied to Bowden wires. Bowden wires, wound around and fixed to a driving pulley mounted in a rotary shaft of a steering wheel, are connected to a steering gear box. A cylinder lock operated by an ignition key is mounted on a driving-pulley housing having the driving pulley accommodated therein. By bringing a lock pin protruding from the cylinder lock, operated to a lock position, into engagement into a lock bore in the driving pulley, the rotation of the driving pulley is inhibited to lock the steering wheel.

12 Claims, 6 Drawing Sheets

CABLE STEERING DEVICE WITH STEERING LOCK

BACKGROUND OF THE INVENTION

1. Field of the Invention

The present invention relates to a cable-type steering device, including a wire driving means connected to a steering wheel, and a wire follower means connected to a gear box for steering vehicle wheels, the wire driving means and the wire follower means being connected to each other by wires, so that a steering torque inputted to the steering wheel is transmitted to the gear box through the wires.

2. Description of the Related Art

In a conventional steering device for a vehicle, a steering shaft having a steering wheel at an upper end thereof is connected at its lower end to a gear box, so that a steering torque inputted to the steering wheel is transmitted through the steering shaft to a rack and pinion mechanism which is mounted within the gear box.

However, if the steering wheel and the gear box are connected to each other using the steering shaft, it is difficult to freely select the position of the steering wheel relative to the position of the gear box. For this reason, there is a problem in that the degree of design freedom is substantially limited. Also, the gear box cannot be commonly used in a right-hand steered vehicle and a left-hand steered vehicle. Moreover, another problem is that the vibration encountered by a tire from a road surface and the vibration of an engine are transferred to the steering wheel through the steering shaft and hence, the silence within a vehicle compartment and the riding comfort of the vehicle are impeded by such vibrations.

Therefore, there is a proposed cable-type steering device which employs a flexible transmitting means such as Bowden wire and the like, in place of the conventional steering shaft (see Japanese Patent Application Laid-open No. 7-117625).

If the construction of the proposed cable-type steering device is used, the position of the steering wheel relative to the position of the gear box can be freely selected and moreover, the vibration of the gear box is difficult to be transmitted to the steering wheel and hence, the above-described problems can be solved.

In a steering-wheel lock mechanism in the above conventional cable-type steering device, a locking pin appearing from and disappearing in a key cylinder engages a locking hole in a locking plate secured to an intermediate portion of an inner wire of the Bowden wire to inhibit rotation of the steering wheel.

In the above conventional steering device, however, it is required that the Bowden wires are disposed rectilinearly in a range in which a lock plate, as a rigid member, is moved. For this reason, a limitation to the handling of the Bowden wires is produced and hence, in some cases, it is difficult to mount the steering-wheel lock mechanism at a location near the steering wheel. In addition, the rotation of the steering wheel is inhibited by locking the Bowden wires and for this reason, in some cases, a load for rotating the steering wheel is applied directly to the Bowden wires to produce an elongation and a looseness of the Bowden wires.

SUMMARY OF THE INVENTION

The present invention has been accomplished in view of the above circumstances, and it is an object of the present invention to mount the steering-wheel lock mechanism at a location in which a driver can easily operate the steering-wheel lock mechanism, and prevent a large load from being applied to the Bowden wires.

Objects of the present invention are achieved by providing a cable-type steering device having a wire driving means connected to a steering wheel, a wire follower means connected to a gear box for steering vehicle wheels, and a lock means mounted on a housing, having the wire driving means accommodated therein, for inhibiting the rotation of the wire driving means (see, e.g., FIGS. 1–3). The wire driving means and the wire follower means are connected to each other by wires, so that a steering torque inputted to the steering wheel is transmitted to the gear box through the wires.

According to the present invention, when the lock means mounted on the housing having the wire driving means accommodated therein is operated, the rotation of the wire driving means is inhibited and hence, the steering wheel connected to the wire driving means is locked. The lock means is mounted on the housing near the steering wheel and hence, it is easy to operate the lock means by a driver and moreover, even if an attempt is made to rotate the locked steering wheel, a load cannot be applied to the wires.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
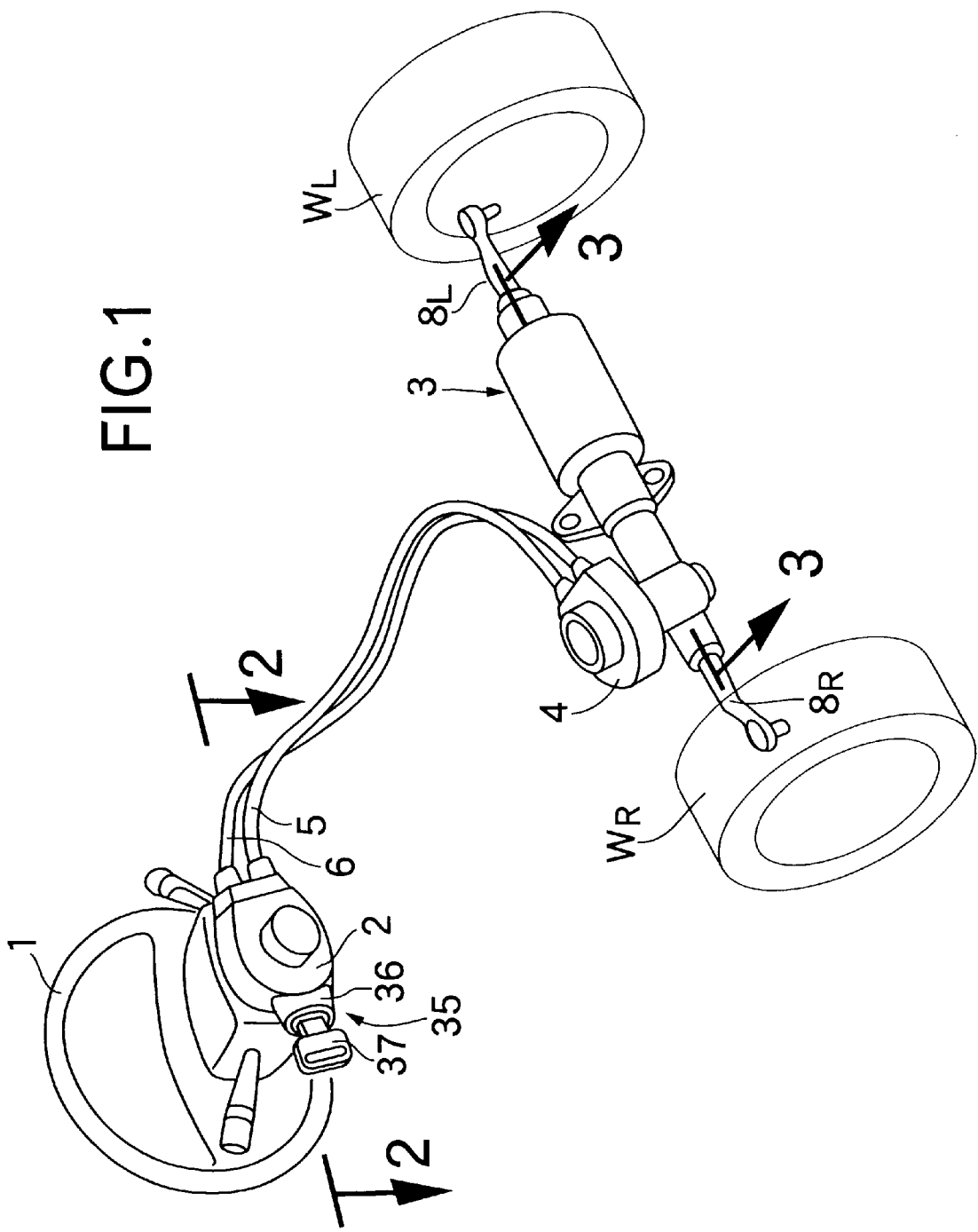
FIG. 1 is a perspective view of the entire arrangement of a steering device for a vehicle according to a first embodiment of the invention.

Reference will now be made in detail to the preferred embodiments of the present invention, examples of which are illustrated in the accompanying drawings FIGS. 1 to 6, wherein like reference numerals refer to like elements throughout.

Figure 2:
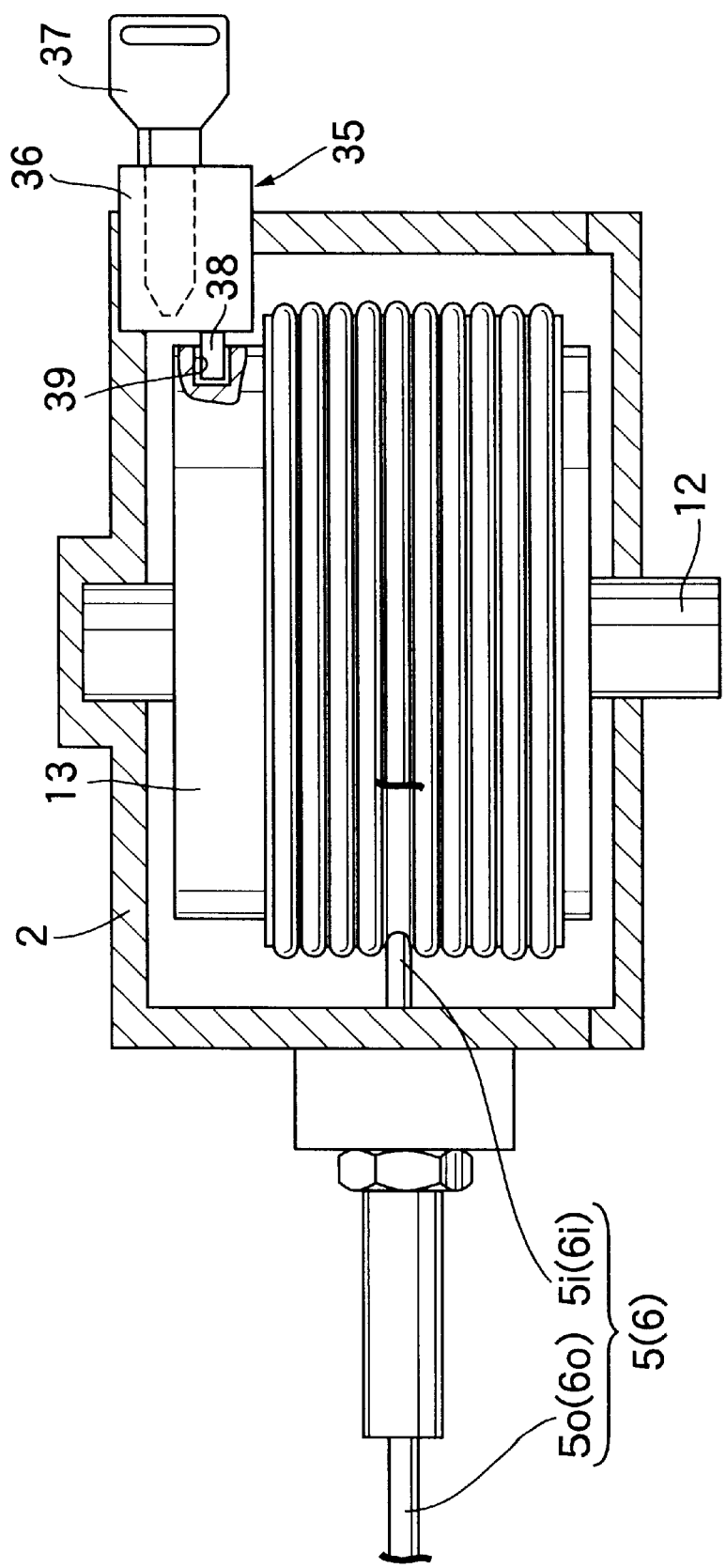
FIG. 2 is an enlarged sectional view taken along a line 2—2 in FIG. 1 of a preferred embodiment of the present invention.
Figure 3:
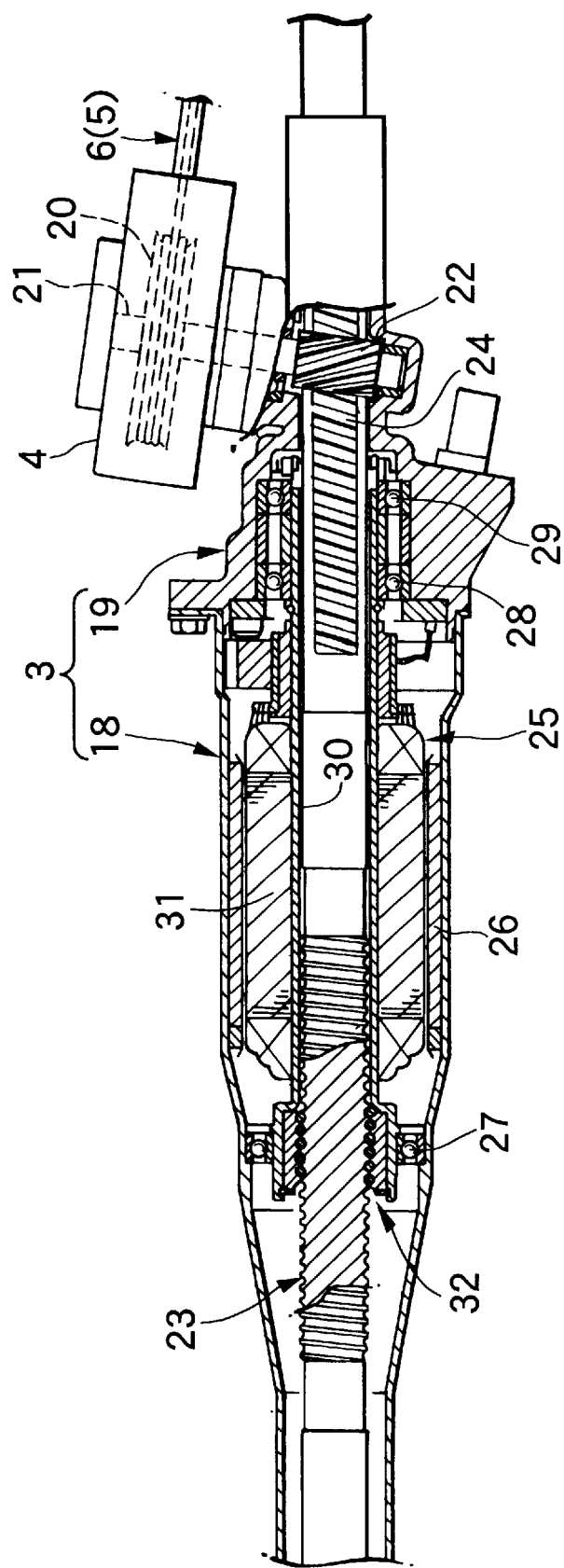
FIG. 3 is an enlarged sectional view taken along a line 3—3 in FIG. 1.

FIGS. 1 to 3 illustrate a first embodiment of the present invention. FIG. 1 is a perspective view of the entire arrangement of a steering device for a vehicle; FIG. 2 is an enlarged sectional view taken along a line 2—2 in FIG. 1; and FIG. 3 is an enlarged sectional view taken along a line 3—3 in FIG. 1.

As shown in FIG. 1, a driving pulley housing 2 mounted in front of a steering wheel 1 of an automobile and a follower pulley housing 4 mounted on a gear box 3 are connected to each other by two Bowden wires. Tie rods $8_L$ and $8_R$ extend laterally of a vehicle body from opposite ends of the gear box 3 and are connected to knuckles (not shown) for supporting left and right wheels $W_L$ and $W_R$.

As shown in FIG. 2, a driving pulley 13 is fixed to a rotary shaft 12 which is rotatably supported on the driving-pulley housing 2 and rotated along with the steering wheel 1. Each of the Bowden wires 5 and 6 includes an outer tube 5o, 6o, and an inner cable slidably 5i, 6i accommodated in the outer tube 5o, 6o. One end of each of the inner cables 5i and 6i is wound around and fixed in a helical pulley groove defined in an outer periphery of the driving pulley 13, and one end of each of the outer tubes 5o and 6o is fixed to the driving-pulley housing 2.

As shown in FIG. 3, the gear box 3 is divided into a left motor accommodating chamber 18, and a right rack and pinion accommodating chamber 19, and the follower pulley housing 4 is supported on the rack and pinion accommodating chamber 19. A rotary shaft 21 integral with a follower pulley 20 mounted in the follower pulley housing 4 extends into the rack and pinion accommodating chamber 19, and a pinion 22 is fixed to the extension of the rotary shaft 21. A steering rod 23 is slidably supported in the gear box 3 and connected at its opposite ends to the tie rods $8_L$ and $8_R$, and the pinion 22 is meshed with a rack 24 formed on the steering rod 23.

The other end of each of the inner cables 5i and 6i of the two Bowden wires 5 and 6 is wound around and fixed to an outer periphery of the follower pulley 20, and the other end of each of the outer tubes 5o and 6o is fixed to a proper point of the follower pulley housing 4.

A motor 25 for a power-steering operation is accommodated in the motor accommodating chamber 18 in the gear box 3 and includes a stator 26 secured to an inner peripheral surface of the motor accommodating chamber 18, a motor output shaft 30 rotatably supported on the inner peripheral surface of the motor accommodating chamber 18 through three ball bearings 27, 28 and 29, and fitted over an outer periphery of the steering rod 23, and a rotor 31 secured to the motor output shaft 30 and opposed to the stator 26. A ball screw mechanism 32 is interposed between an inner peripheral surface of the motor output shaft 30 and an outer peripheral surface of the steering rod 23, so that a steerage assisting force for laterally reciprocating the steering rod 23 can be generated by driving the motor 25 to rotate the motor output shaft 30 in opposite directions.

As can be seen from FIGS. 1 and 2, a steering-wheel locking mechanism 35 integral with an ignition switch is mounted on the driving-pulley housing 2. The steering-wheel locking mechanism 35 includes a well-known cylinder lock 36 fixed to the driving-pulley housing 2. The cylinder lock 36, which is operated by an ignition key 37, is switchable among a locking position in which the steering-wheel locking mechanism 35 is operated, an accessory position in which electric devices such as a radio and the like are usable, an ON position in which an engine is operated, a start position in which a starter motor is operated, and the like.

When the cylinder lock 36 is in the lock position in which the ignition key 37 can be inserted and withdrawn, a lock pin 38 protruding from the cylinder lock 36 is in engagement with a lock bore 39 which is defined in an outer peripheral surface of the driving pulley 13.

The operation of the embodiment of the present invention having the above-described arrangement will be described below.

When the steering wheel 1 is rotated to turn the vehicle, the rotary shaft 12 is rotated along with the driving pulley 13, so that the inner cables 5i and 6i of the Bowden wires 5 and 6 are pushed and pulled, as shown in FIG. 2. As a result, the follower pulley 20 on the gear box 3 is rotated in unison with the rotary shaft 21 and the pinion 22, as shown in FIG. 3, thereby causing a steering torque to be transmitted to the rack 24.

When the steering torque of the steering wheel 1 is detected by a detecting means (not shown) mounted within the driving-pulley housing 2, the motor 25 for the power-steering operation is driven based on the steering torque. Thus, the steering rod 23 is driven laterally by the motor 25 for the power-steering operation to assist the operation of the steering wheel 1 provided by a driver.

Since the steering wheel 1 and the gear box 3 are connected to each other by the Bowden wires 5 and 6 having a flexibility as described above, the steering wheel 1 can be disposed at any location with respect to the gear box 3, leading to an increased degree of design freedom. Thus, the gear box 3 can be commonly used in a right-hand steered vehicle and a left-hand steered vehicle, and the structures of a tilt mechanism and a telescopic mechanism for the steering wheel 1 can be simplified.

A conventional steering shaft connecting the steering wheel 1 and the gear box 3 is not used and hence, it is difficult to transmit the vibration of the gear box 3 and the vibration of an engine to the steering wheel 1, thereby providing an enhanced riding comfort, but also ensuring a sufficient space around driver's feet to provide an enhanced residence. Moreover, during a collision of the vehicle, the steering wheel 1 can be moved forwards of the vehicle body at a sufficient stroke and hence, a large shock absorbing effect can be exhibited.

Further, since the steering-wheel lock mechanism 35 is mounted to the driving-pulley housing 2 near the driver, it is easy to operate the steering-wheel lock mechanism 35. Moreover, when an attempt is made to force the steering wheel 1 to be rotated during operation of the steering-wheel lock mechanism 35, such a load is received by the driving pulley 13 and is not transmitted to the Bowden wires 5 and 6 and for this reason, there is no possibility that the Bowden wires 5 and 6 can be expanded to produce a looseness.

Other embodiments of the present invention will be described with reference to FIGS. 4 to 6.

Figure 4:
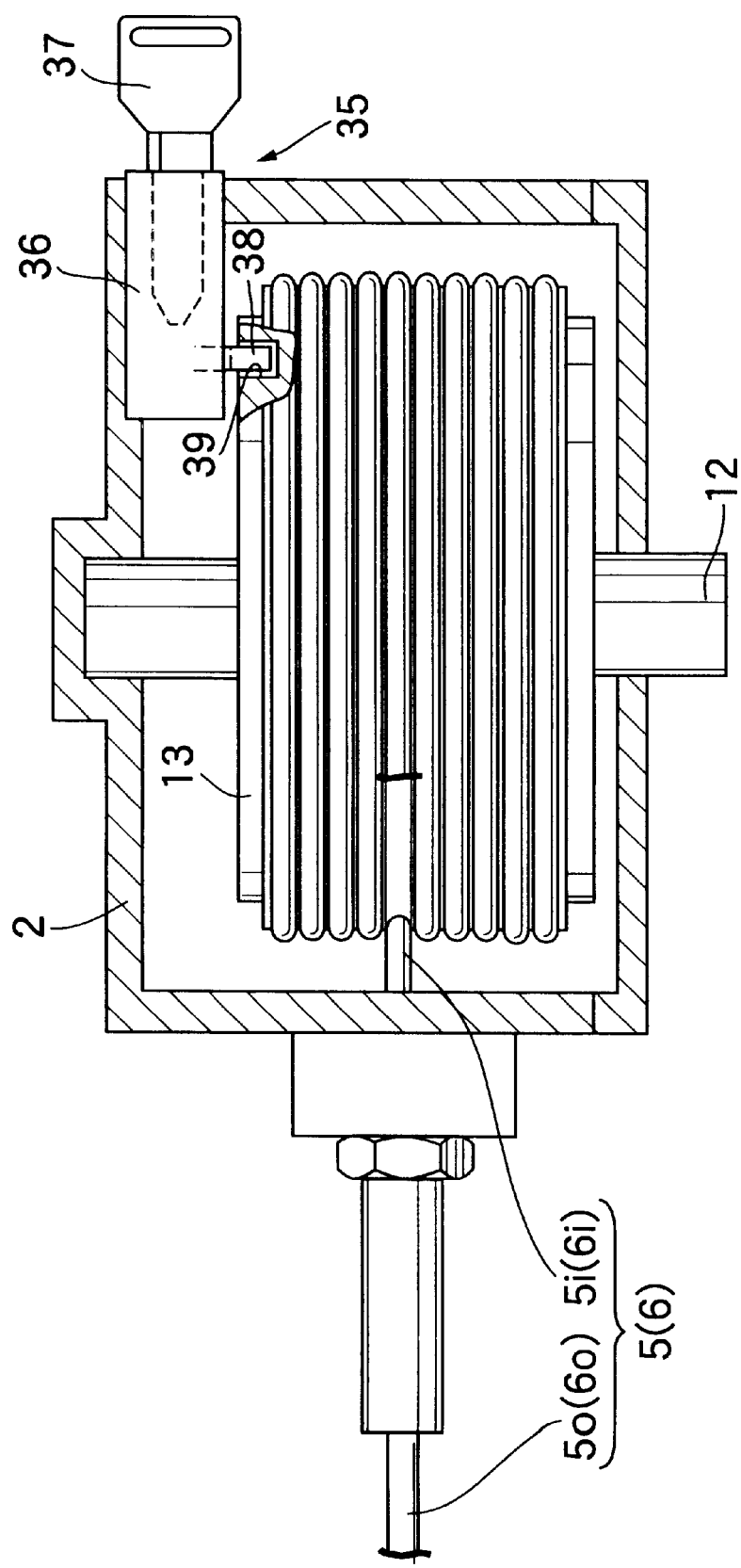
FIG. 4 is a sectional view of a second preferred embodiment of the present invention.
Figure 5:
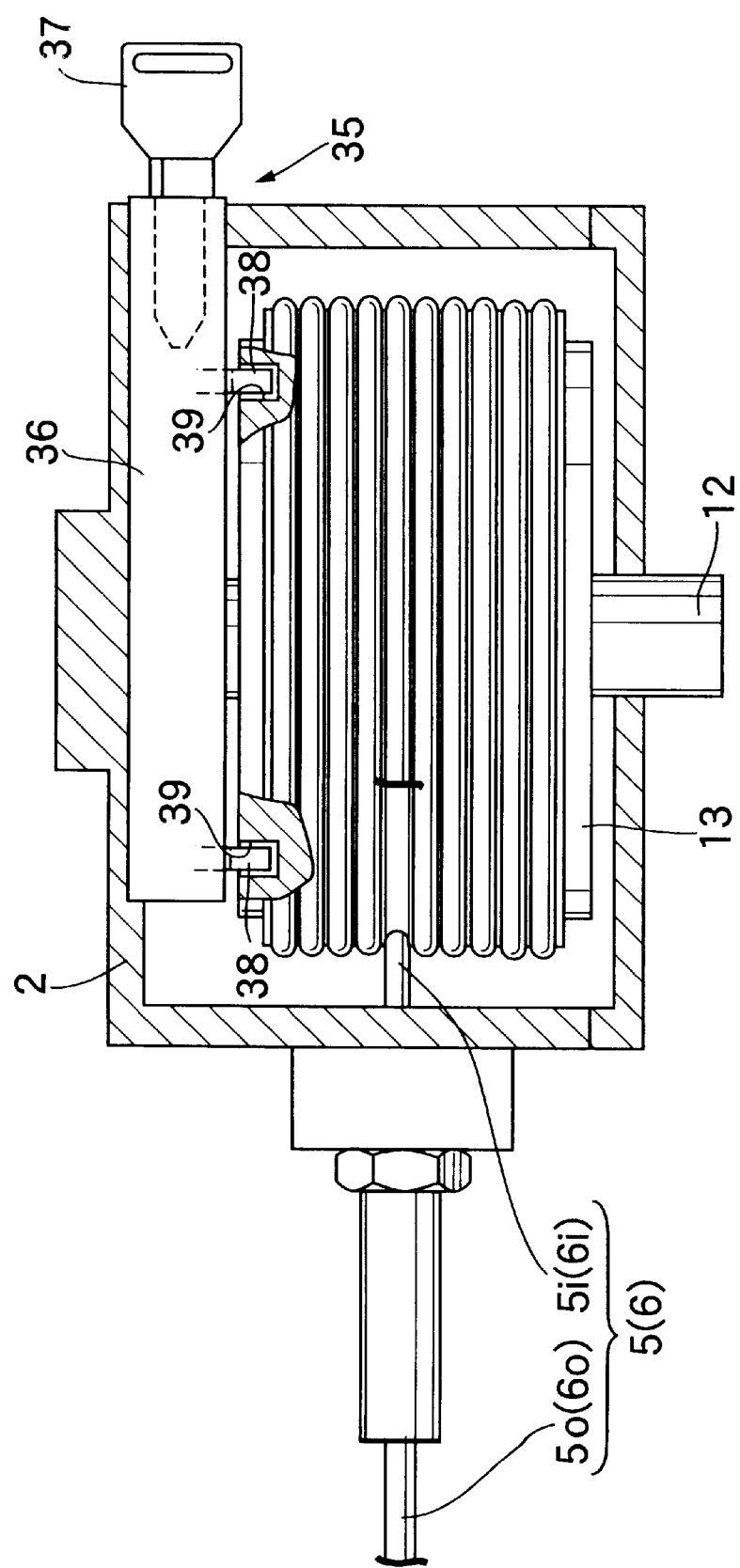
FIG. 5 is a sectional view of a third preferred embodiment of the present invention.

In the second embodiment shown in FIG. 4, the lock bore 39, into which the lock pin 38 of the cylinder lock 36 of the steering-wheel lock mechanism 35 is engaged, is provided in a side of the driving pulley 13 rather in the outer peripheral surface of the driving pulley 13. In the third embodiment shown in FIG. 5, two lock pins 38, 38 are provided on the cylinder lock 36 and adapted to be engaged into two lock bores 39, 39 provided in a side of the driving pulley 13. According to the third embodiment, the rotation of the driving pulley 13 can be further reliably limited to enhance the reliability of the lock mechanism 35.

Figure 6:
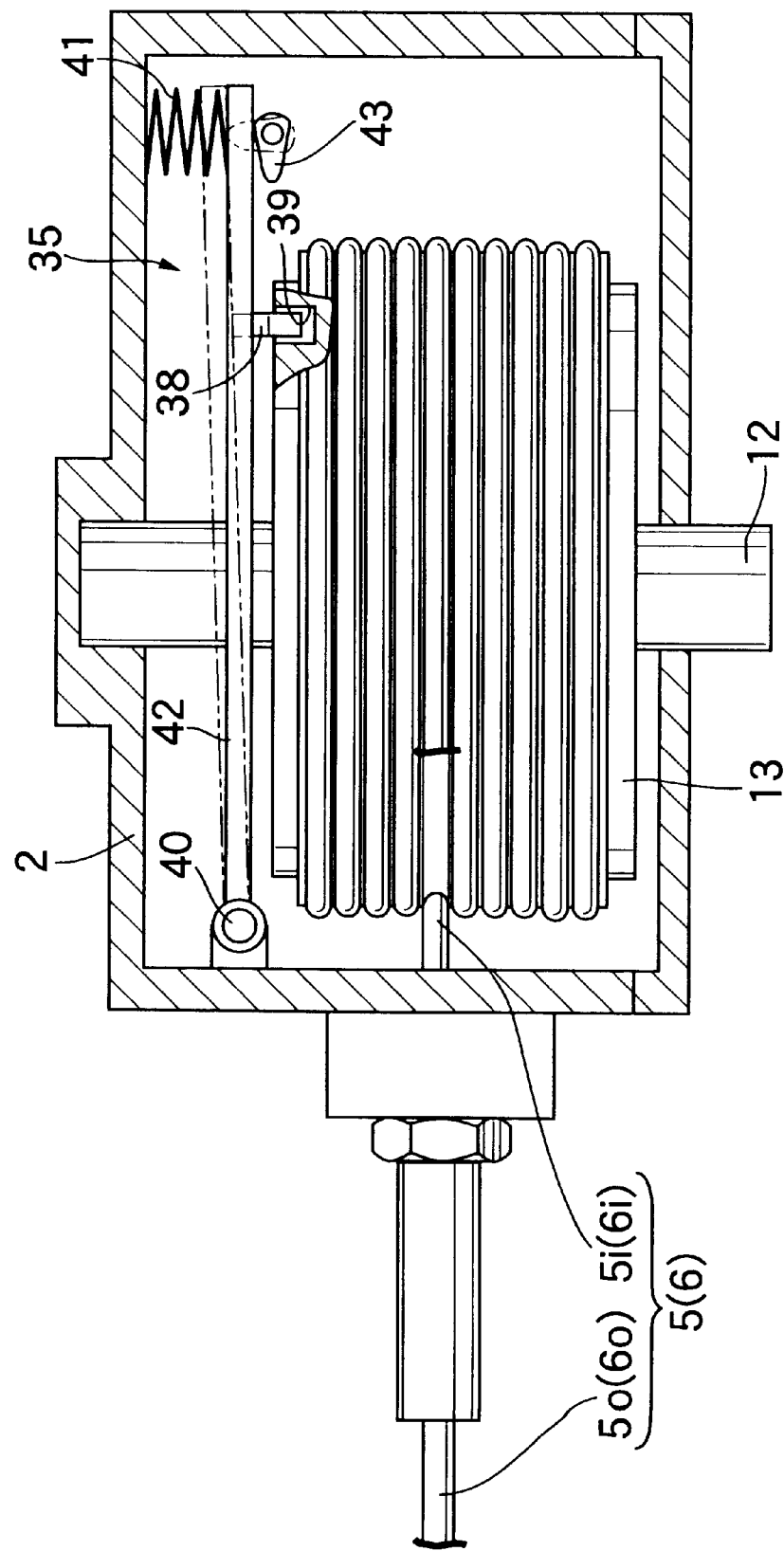
FIG. 6 is a sectional view of a fourth preferred embodiment of the present invention.

The steering-wheel lock mechanism 35 in the fourth embodiment shown in FIG. 6 includes a lock arm 42 which is carried on a rotary shaft 40 and biased toward the driving pulley 13 by a spring 41. The lock pin 38 is provided on the lock arm 42 and adapted to be engaged into a lock bore 39 in the driving pulley 13. When a cam member 43 is rotated by the cylinder lock (not shown), the lock arm 42 is rotated in a direction away from the driving pulley 13, so that the lock pin 38 is disengaged from the lock bore 39 to release the locking of the driving pulley 13.

Therefore, even if the phases of the lock bore 39 and the lock pin 38 are not aligned with each other when the cam member 43 has been rotated to a shown position to lock the driving pulley 13, if the steering wheel 1 is operated to rotate the driving pulley 13, the lock pin 38 is brought into engagement into the lock bore 39 when such phases have been aligned with each other. Thus, the cylinder lock can be operated to the lock position even if the steering wheel 1 is not located at a predetermined position, leading to an enhanced convenience.

Although the embodiment of the present invention has been described in detail, it will be understood that the present invention is not limited to the above-described embodiment, and various modifications may be made without departing from the spirit and scope of the invention defined in claims.

For example, the driving pulley 13 and the follower pulley 20 are employed as a wire driving means and a wire follower means in the embodiments. However, in place of these pulleys 13 and 20, arms may be employed which are secured at their central portions to the rotary shafts 12 and 21 and connected at their opposite ends to the inner cables 5i and 6i of the Bowden wires 5 and 6.

As discussed above, according to the present invention, the lock means for inhibiting the rotation of the wire driving means is mounted on the housing having the wire driving means accommodated therein. Therefore, the position of the lock means is near the driver and hence, it is easy to operate the lock means. Moreover, even if an attempt is made to rotate the locked steering wheel, a load cannot be applied to the wires.

What is claimed is:

1. A cable steering device, comprising:

a wire driving device connected to a steering wheel and accommodated in a housing;

a wire follower device connected to a gear box for steering vehicle wheels; and lock means, mounted on the housing, engageable with said wire driving device for inhibiting rotation of said wire driving device, said wire driving device and said wire follower device being connected to each other by wires which transmit a steering torque, inputted through the steering wheel, to the gear box.

2. A cable steering device as recited in claim 1, wherein said lock means includes:

a cylinder lock; and a lock pin protruding from said cylinder lock, and wherein said wire driving device includes a lock bore disposed in an outer peripheral surface of said wire driving device, said lock pin engaging with said lock bore in a lock position.

3. A cable steering device as recited in claim 1, wherein said lock means includes:

a cylinder lock; and a lock pin protruding from said cylinder lock, and wherein said wire driving device includes a lock bore disposed in a side surface of said wire driving device, said lock pin engaging with said lock bore in a lock position.

4. A cable steering device as recited in claim 1, wherein said lock means includes:

a rotary shaft mounted in the housing of said wire driving device;

a lock arm provided on said rotary shaft and biased toward a side surface of said wire driving device; and a lock pin provided on said lock arm, and wherein said wire driving device includes a lock bore disposed in the side surface of said wire driving device, said lock pin engaging with said lock bore in a lock position.

5. A cable steering device, comprising:

a wire driving pulley connected to a steering wheel and accommodated in a housing;

a wire follower pulley connected to a gear box for steering vehicle wheels; and lock means, mounted on the housing, engageable with said wire driving pulley for inhibiting rotation of said wire driving pulley, said wire driving pulley and said wire follower pulley being connected to each other by wires, wound around said wire driving pulley and said wire follower pulley, which transmit a steering torque, inputted through the steering wheel, to the gear box.

6. A cable steering device as recited in claim 5, wherein said lock means includes:

a cylinder lock; and a lock pin protruding from said cylinder lock, and wherein said wire driving pulley includes a lock bore disposed in an outer peripheral surface of said wire driving pulley, said lock pin engaging with said lock bore in a lock position.

7. A cable steering device as recited in claim 5, wherein said lock means includes:

a cylinder lock; and a lock pin protruding from said cylinder lock, and wherein said wire driving pulley includes a lock bore disposed in a side surface of said wire driving pulley, said lock pin engaging with said lock bore in a lock position.

8. A cable steering device as recited in claim 5, wherein said lock means includes:

a rotary shaft mounted to the housing of the wire driving pulley;

a lock arm provided on said rotary shaft and biased toward a side surface of said wire driving pulley; and a lock pin provided on said lock arm, and wherein said wire driving pulley includes a lock bore disposed in the side surface of said wire driving pulley, said lock pin engaging with said lock bore in a lock position.

9. A cable steering device, comprising:

a wire driving pulley connected to a steering wheel and accommodated in a housing;

a wire follower pulley connected to a gear box for steering vehicle wheels and connected to said wire driving pulley through wires wound around said wire driving pulley and said wire follower pulley; and a lock mechanism, mounted on the housing, engaging said wire driving pulley to inhibit rotation of said wire driving pulley.

10. A cable steering device as recited in claim 9, wherein said lock mechanism includes:

a cylinder lock; and a lock pin protruding from said cylinder lock, and wherein said wire driving pulley includes a lock bore disposed in an outer peripheral surface of said wire driving pulley, said lock pin engaging with said lock bore in a lock position.

11. A cable steering device as recited in claim 9, wherein said lock mechanism includes:

a cylinder lock; and a lock pin protruding from said cylinder lock, and wherein said wire driving pulley includes a lock bore disposed in a side surface of said wire driving pulley, said lock pin engaging with said lock bore in a lock position.

12. A cable steering device as recited in claim 9, wherein said lock mechanism includes:

a rotary shaft mounted to the housing of the wire driving pulley;

a lock arm provided on said rotary shaft and biased toward a side surface of said wire driving pulley; and a lock pin provided on said lock arm, and wherein said wire driving pulley includes a lock bore disposed in the side surface of said wire driving pulley, said lock pin engaging with said lock bore in a lock position.

* * * * *